United States Patent
Western et al.

(10) Patent No.: US 9,881,158 B2
(45) Date of Patent: Jan. 30, 2018

(54) SECURE OPTION ROM CONTROL

(71) Applicant: Insyde Software Corp., Taipei (TW)

(72) Inventors: Trevor Western, Sudbury, MA (US); Jeffery Jay Bobzin, Harvard, MA (US)

(73) Assignee: Insyde Software Corp., Taipei (TW)

( * ) Notice: Subject to any disclaimer, the term of this patent is extended or adjusted under 35 U.S.C. 154(b) by 277 days.

(21) Appl. No.: 13/657,003

(22) Filed: Oct. 22, 2012

(65) Prior Publication Data
US 2013/0104188 A1    Apr. 25, 2013

Related U.S. Application Data

(60) Provisional application No. 61/550,110, filed on Oct. 21, 2011.

(51) Int. Cl.
G06F 21/57 (2013.01)

(52) U.S. Cl.
CPC .................. G06F 21/57 (2013.01)

(58) Field of Classification Search
CPC .... G06F 3/0604–3/0607; G06F 9/4411; G06F 21/44–21/46; G06F 21/57–21/577; G06F 21/602–21/604
USPC ..................... 713/2; 726/1, 16–20
See application file for complete search history.

(56) References Cited

U.S. PATENT DOCUMENTS

| | | |
|---|---|---|
| 6,185,678 B1 | 2/2001 | Arbaugh et al. |
| 2009/0172797 A1 | 7/2009 | Yao et al. |
| 2010/0017587 A1 | 1/2010 | Wiginton et al. |
| 2010/0083002 A1 | 4/2010 | Cui et al. |
| 2010/0169633 A1* | 7/2010 | Zimmer ............... G06F 21/575 713/2 |
| 2010/0332813 A1 | 12/2010 | Rothman et al. |
| 2010/0332825 A1* | 12/2010 | Bradley et al. ............ 713/158 |

FOREIGN PATENT DOCUMENTS

| | | |
|---|---|---|
| TW | 569100 B | 1/2004 |
| TW | 594488 B | 6/2004 |

OTHER PUBLICATIONS

Unified EFI Forum. "Unified Extensible Firmware Interface Specification" Version 2.2 D. <http://www.uefi.org/sites/default/files/resources/UEFI_Spec_2_2_D.pdf> Published: Nov. 2, 2010.*

(Continued)

*Primary Examiner* — Kevin Bechtel
(74) *Attorney, Agent, or Firm* — McCarter & English, LLP; John S. Curran

(57) ABSTRACT

A mechanism for controlling the execution of Option ROM code on a Unified Extensible Firmware Interface (UEFI)-compliant computing device is discussed. A security policy enforced by the firmware may be configured by the computing platform designer/IT administrator to take different actions for different types of detected expansion cards or other devices due to the security characteristics of Option ROM drivers associated with the expansion card or device. The security policy may specify whether authorized signed UEFI Option ROM drivers, unauthorized but signed UEFI Option ROM drivers, unsigned UEFI Option ROM drivers and legacy Option ROM drivers are allowed to execute on the UEFI-compliant computing device.

22 Claims, 11 Drawing Sheets

(56) References Cited

OTHER PUBLICATIONS

International Preliminary Report on Patentability and Written Opinion for Application No. PCT/US2012/061301, 6 pages, dated Apr. 22, 2014.
International Search Report and Written Opinion for Application No. PCT/US2012/061301, 8 pages, dated Feb. 8, 2013.

* cited by examiner

Figure 3A

Secure Option ROM control:
Setup User Interface

300

Option ROMs available in system:

| PCI Vendor 302 | PCI Device 304 | Option ROM Type 306 | |
|---|---|---|---|
| Intel (8086) | Widget (699A) | UEFI | Legacy |
| Intel (8086) | NIC (2553) | | Legacy |
| AMD (xxxx) | 19AA (19AA) | UEFI | |
| Yyyy (yyyy) | AFAF (AFAF) | UEFI | Legacy |

Secure Option ROM control:
Setup User Interface

300

Option ROMs available in system:

| PCI Vendor | PCI Device | Option ROM Type | | |
|---|---|---|---|---|
| Intel (8086) | Widget (699A) | UEFI  310 | | Legacy |
| Intel (8086) | NIC (2553) | | | Legacy |
| AMD (xxxx) | 19AA (19AA) | UEFI  310 | | |
| Yyyy (yyyy) | AFAF (AFAF) | UEFI | | Legacy |

Secure Option ROM control: Setup User Interface

Figure 3C

Option ROMs available in system:

| PCI Vendor | PCI Device | Option ROM Type | | | |
|---|---|---|---|---|---|
| Intel (8086) | Widget (699A) | UEFI | 🔒 310 | ⌄ 312 | Legacy |
| Intel (8086) | NIC (2552) | | | | Legacy |
| AMD (xxxx) | 19AA (19AA) | UEFI | 🔒 310 | ⌄ 312 | |
| Yyyy (yyyy) | AFAF (AFAF) | UEFI | | | Legacy |

Secure Option ROM control:
Setup User Interface

300

Option ROMs available in system:

| PCI Vendor | PCI Device | Option ROM Type | | |
|---|---|---|---|---|
| Intel (8086) | Widget (699A) | UEFI 🔒 | ◉ | Legacy |
| Intel (8086) | NIC (2553) | | | Legacy 314 |
| AMD (xxxx) | 19AA (19AA) | UEFI 🔒 | ◉ | |
| Yyyy (yyyy) | AFAF (AFAF) | UEFI 316 | ◉ | Legacy |

Figure 3E

Secure Option ROM control:
Setup User Interface

Option ROMs available in system:

| PCI Vendor | PCI Device | Option ROM | | Option ROM Type | |
|---|---|---|---|---|---|
| Intel (8086) | Widget (699A) | UEFI | 🔒 | Legacy | |
| Intel (8086) | NIC (2553) | | | Legacy | ✓ |
| AMD (xxxx) | 19AA (19AA) | UEFI | 🔒 | | |
| Yyyy (yyyy) | AFAF (AFAF) | UEFI | 🔒 | Legacy | |
| [ABCD] 320 | [1234] 322 | UEFI | ✓ | | |

Figure 3F

Secure Option ROM control:
Setup User Interface

300

Option ROMs available in system:

| PCI Vendor | PCI Device | Option ROM Type | | |
|---|---|---|---|---|
| Intel (8086) | Widget (699A) | UEFI | | |
| Intel (8086) | NIC (2553) | | Legacy | |

Default Option ROM policy:

| [Undiscovered] | [All] 324 | | [UEFI] | Legacy |

Figure 3G

Secure Option ROM control:
Setup User Interface

Option ROMs available in system:

| PCI Vendor | PCI Device | Option ROM Type | | |
|---|---|---|---|---|
| Intel (8086) | Widget (699A) | UEFI | | Legacy |
| Intel (8086) | NIC (2553) | | | Legacy |
| AMD (1235) | NIC (4567) 326 | UEFI 330 | | |
| AMD (1235) | Video (AAAA) 328 | UEFI 332 | | Legacy |

Secure Option ROM control:
Setup User Interface

Option ROMs available in system:

| PCI Vendor | PCI Device | Option ROM Type | | |
|---|---|---|---|---|
| Intel (8086) | Widget (699A) | UEFI 🔒 | Legacy | |
| Intel (8086) | NIC (2553) | | Legacy ✓ | 340 |
| AMD (xxxx) | 19AA (19AA) | UEFI ✓ 🔒 | | |
| Yyyy (yyyy) | AFAF (AFAF) | UEFI | Legacy | |

300

SECURE OPTION ROM CONTROL

RELATED APPLICATION

This application is related to and claims the benefit of U.S. provisional patent application No. 61/550,110, entitled "Secure Option ROM Control", filed on Oct. 21, 2011, the contents of which are incorporated herein by reference in their entirety.

BACKGROUND

The Unified Extensible Firmware Interface (UEFI) is a specification created by a non-profit industry body detailing a programming interface between an Operating System and the included firmware of a computing device such as (but not limited to) a Personal Computer (PC), laptop, mobile or tablet computing device. Firmware is software that has been written onto Read-Only Memory (ROM) modules including but not limited to ROM, PROM, EPROM, EEPROM, and Flash memory. Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security reasons. UEFI specifications describe a set of tools by which a computing device can move in an organized fashion from a power-applied state to a fully operational state. In computer terms, the computing platform is initialized by firmware included within the platform and this firmware provides a range of software services which facilitate the boot of the operating system. The UEFI specification indicates the desired result but deliberately does not specify the internal tactic of implementation. The UEFI firmware specification replaces earlier operating system (OS)/firmware interfaces previously used by the industry and commonly known as legacy BIOS (Basic Input Output System).

Computer systems may contain one or more expansion slots conforming to the Peripheral Component Interconnect (PCI) Express specification. These slots can be used to install optional input-output boards (also referred to as "expansion cards" or "option cards") which expand the capabilities of the system. These expansion cards may include legacy BIOS components (legacy BIOS components include system BIOS which is delivered with and supports the system platform and legacy Option ROMS which are incorporated into option cards and which support the initialization of the card).

An Option ROM driver (also referred to hereafter as "Option ROM" or "driver") is binary code to extend the BIOS or UEFI firmware to support hardware. The Option ROM driver may be included on a flash store on the plug-in card when the card is shipped or may be a driver associated with the card that is separately downloaded or otherwise communicated to the computing device. The BIOS (or UEFI Firmware) executes the Option ROM code when a matching plug-in adapter card (or device on the motherboard) is discovered. The Option ROM code is used to communicate with the hardware prior to the loading of the operating system.

Option ROMs were originally created by IBM in the late 1970's to provide code to extend the BIOS functions in the IBM PC to support an Industry Standard Architecture (ISA) plug-in adapter card (an early form of an expansion/option card). IBM published the format and interfaces for the Option ROM code and it was widely adopted for the IBM PC (and other clone machines). In the late 1980's, Intel created the PCI bus and designed plug-in adapter cards that also used Option ROM code. Intel (and the PCI Industry organization) published the format and the interface for the PCI Option ROM code and it too has been widely adopted. In 2005, the UEFI industry organization published the UEFI Option ROM format and interface. Each change to the Option ROM format and interface (ISA→PCI→UEFI) has represented an improvement in configurability, robustness and security for the Option ROM code. The recent UEFI specification update version 2.3.1 introduced a more secure method for authenticating the origin and integrity of the UEFI Option ROM code ("UEFI Signed Option ROMs"). The UEFI specification provides the ability to create UEFI firmware for the system board as well as enabling a UEFI Option ROM driver to be incorporated into the expansion card by the manufacturer. Unfortunately, as the industry transitions, currently manufactured Option Cards frequently include only legacy Option ROMs rather than UEFI format signed Option ROMs.

BRIEF SUMMARY

Embodiments of the present invention implement a system of policies and software checks that provide flexibility to an IT administrator or other authorized user constructing a security policy to control the execution of Option ROM code on a Unified Extensible Firmware Interface (UEFI)-compliant computing device. More specifically, the embodiments of the present invention provide a mechanism for controlling the execution of various formats of Option ROM code on a UEFI-compliant computing device. A security policy enforced by the firmware may be configured by the computing platform designer/IT administrator to take different actions for different types of detected expansion cards or other devices due to the security characteristics of Option ROM drivers associated with the expansion card or device. The security policy may specify whether authorized signed UEFI Option ROM drivers, unauthorized but signed UEFI Option ROM drivers, unsigned UEFI Option ROM drivers and legacy Option ROM drivers are allowed to execute on the UEFI-compliant computing device.

In one embodiment a computer-implemented method for enforcing a security policy on a Unified Extensible Firmware Interface (UEFI)-compliant computing device includes the step of detecting a presence of an expansion card in an expansion card slot on the UEFI-compliant computing device. The detection occurs during a boot phase before the loading of an operating system for the UEFI-compliant computing device. The method also identifies at least one Option ROM driver for the expansion card and determines that the at least one Option ROM driver is not an authorized signed UEFI driver. The method further consults a security policy for the computing device regarding Option ROM driver execution and enforces the security policy based on an identified characteristic of the at least one Option ROM driver.

In another embodiment, a Unified Extensible Firmware Interface (UEFI)-compliant computing device includes a Read Only Memory (ROM) holding firmware and at least one expansion card slot holding an expansion card. The UEFI-compliant computing device also includes at least one Option ROM driver associated with the expansion card and accessible by the firmware and a processor configured to execute the firmware during a boot sequence following an identification of the expansion card and before the operating system loads. The execution of the firmware identifies at least one Option ROM driver associated with the expansion card as not being an authorized signed UEFI driver and enforces a security policy regarding Option ROM driver execution based on a characteristic of the identified at least one Option Rom driver.

In an embodiment a computer-implemented method for enforcing a security policy on a Unified Extensible Firmware Interface (UEFI)-compliant computing device includes the step of detecting a device requiring an Option ROM driver for initialization on the UEFI-compliant computing device. The detection occurs during a boot phase before the loading of an operating system for the UEFI-compliant computing device. The method also identifies at least one Option ROM driver for the detected device and determines that the at least one Option ROM driver is not an authorized signed UEFI driver. The method further consults a security policy for the computing device regarding Option ROM driver execution and enforces the security policy based on an identified characteristic of the at least one Option ROM driver.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIGS. 3A-3H depict an exemplary user interface enabling an IT administrator or other authorized individual to set up a security policy in an embodiment of the present invention.

DETAILED DESCRIPTION

Figure 1:
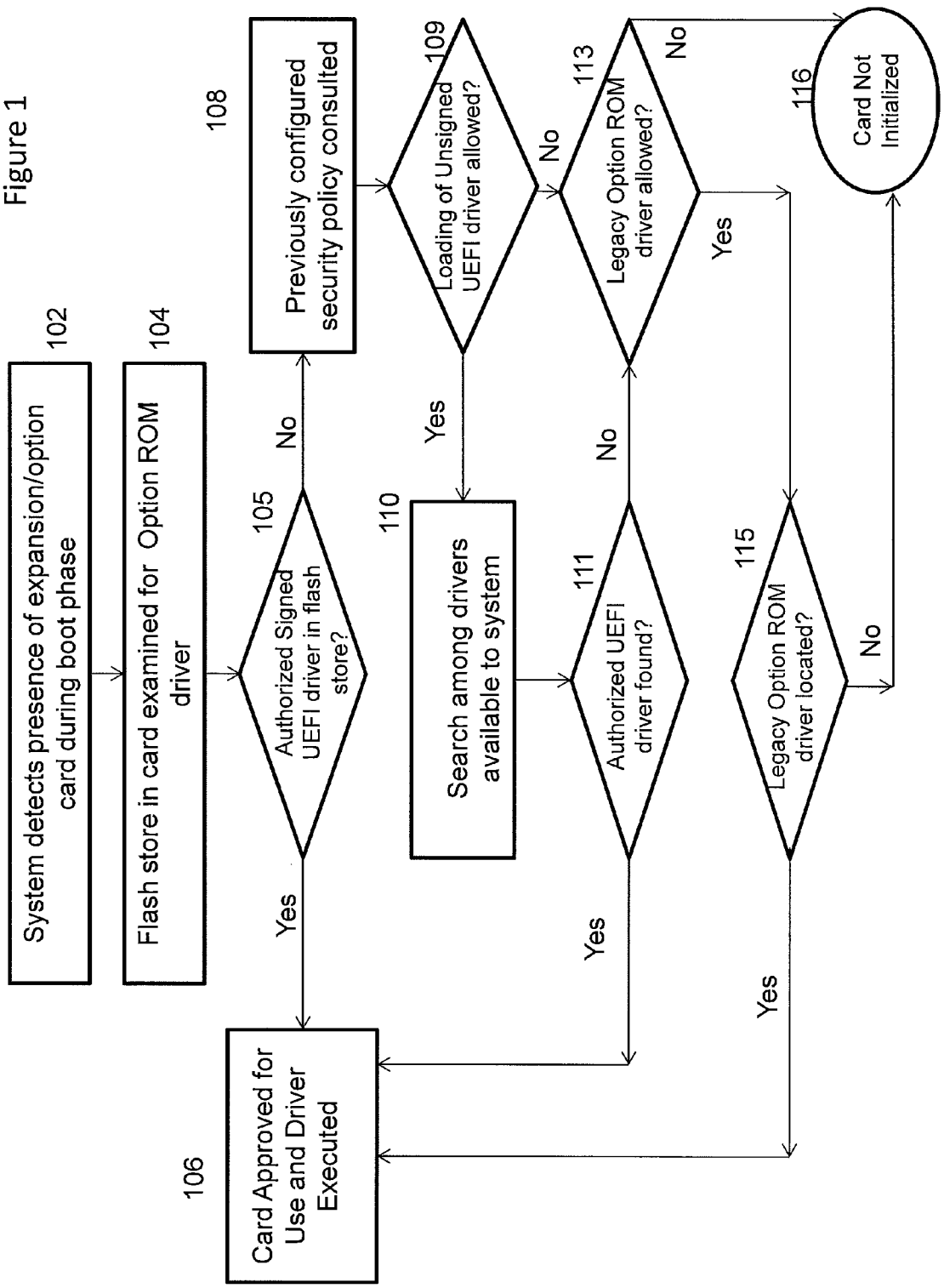
FIG. 1 depicts an exemplary sequence of steps performed by an embodiment of the present invention to verify Option ROM drivers associated with an existing or newly added expansion card.

There exists today a wide variety of software created by unauthorized third parties with the explicit intent to damage or subvert the proper operation of computing devices. Given the names 'computer virus' or 'malware' these rogue software elements increasingly target the boot process as a way to get control of a computing device before preventive software has loaded. These forms of boot attacking software are known as root-kits or Trojan Boot Viruses. One part of the solution for protection from these threats is through identification of a trusted originator/source for all platform software elements.

The UEFI specification provides a facility called driver signature checking by which software from other parties can be 'signed' using public/private key cryptographic techniques at its origin and this signature is validated by the platform firmware prior to allowing this software to operate. The signature checking concentrates on software added to configure optional components (such as plug-in boards) and software supplied by Operating System for early boot steps (such as OS boot loaders.) The signature checking is accomplished with a library of approved keys. The platform must take care to not allow unauthorized software elements any ability to modify the library of approved keys as this would allow rogue software elements to defeat the signature checking.

Since the development of the UEFI Option ROM format and interface, an effective security technique for a computing device consists of a set of rules called policies which dictate allowed operations. For example, the policies may include rules that dictate checking the signature of UEFI Option ROMS loaded from expansion cards. These policies can be adjusted according to the needs of the system user. For enhanced security many users will run a computing device with a security policy that will require a signed UEFI Option ROM and forbid the execution of unsigned code from Expansion Cards including legacy Option ROMs. Such a strict policy of course limits the universe of expansion cards that are available to the system to which the policy is applied.

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM. Among other services, the firmware is responsible for operation of the computing device until a boot process can be run which loads an operating system for the computing device into memory. Once loaded, the operating system is in charge of normal operation of the computing device. Of note, anti-virus programs for the computing device require the operating system to be loaded before they can function.

A Flash ROM for a computing device is partitioned into several functional divisions or regions. One such region is called the Authenticated Variable Region or Store that stores Authenticated Variables defined in the UEFI specification. The Authenticated Variable Store is used to hold UEFI-defined security information (the system security database) used to perform signature checking. Because it contains security data and potentially sensitive user data the UEFI specification provides that the Authenticated Variable Region/Store must be protected from alteration by any entity except those authorized by the presence of identifying key data within the security database.

Unfortunately, it is not possible to apply UEFI signing requirements to legacy Option ROMs and many expansion boards still ship with legacy Option ROMs. Usage of legacy Option ROMs presents a company or user with a number of concerns. Compared to UEFI Option ROMs, legacy Option ROMs suffer from slow performance. Additionally, from a security standpoint, legacy Option ROMs allow the modification of almost anything on the computing system and are thus insecure. Additionally, legacy Option ROMs execute only below the 1 MB memory address boundary on the computing device which can result in inadequate space for execution. These factors argue against the use of legacy Option ROMs. However, because many expansion boards still ship with legacy Option ROMs, a company user may desire the increased choices in performing hardware additions to their systems that are available if the use of legacy Option ROMs is allowed.

In light of the above-mentioned considerations, while the UEFI signing mechanism provides a significant upgrade in security, company IT administrators and other authorized individuals are forced to set security policies in a hybrid environment. In this hybrid environment in which some expansion cards utilize signed or unsigned UEFI Option ROMs and some utilize legacy Option ROMs, there is a conflict between the desire for greater security and the value of the wide marketplace of expansion cards. While computer users and companies may wish to adopt computer systems with effective security implementations that protect against malware and other unauthorized or malicious software, they also value the flexibility provided by the large market of expansion boards. The embodiments of the present invention address this tension between security and flexibility by providing firmware that allows an IT administrator or other authorized user to exercise granular control over a security policy controlling the execution of the executable code associated with an expansion/option card.

Embodiments of the present invention evaluate the security status of various drivers in the flash store of an expansion card. Additionally, embodiments of the present invention also allow other drivers available to the system that may be used with an expansion card or other device to be evaluated for execution based on a pre-configured security policy. The firmware of the present invention may also generate a setup user interface through which an IT administrator or other authorized individual is empowered to set a security policy allowing (or not) the execution of authorized signed UEFI Option ROM drivers, signed but not authorized UEFI Option ROM drivers (i.e.: a signed driver which cannot be verified in the Authenticated Variable Store), unsigned UEFI Option ROM drivers, or other legacy Option ROMs.

FIG. 1 depicts an exemplary sequence of steps performed by an embodiment of the present invention to verify drivers associated with an existing or newly added expansion card. The sequence begins with the provision of power to a computing device and the detection of the presence of an expansion/option card during the boot sequence (step 102). Upon detection, the flash store on the expansion card is programmatically examined for drivers (step 104) and a determination is made as to whether the store contains an authorized UEFI signed driver (step 105). If a signed UEFI driver is found, an authorized signer list within the system security database for the computing device is consulted to determine if the driver was signed by a trusted signer (signed UEFI drivers whose signer's certificate is not in the system security database may be treated as unsigned drivers by the security policy). If a correctly signed UEFI driver from a trusted signer is included in the flash store, the expansion card is approved for use and the driver is executed (step 106).

In the event the determination is reached that the card's own flash store does not contain an authorized signed UEFI driver from a trusted signer (step 105), the firmware code of the present invention will cause a previously configured security policy for the computing device/platform to be consulted (step 108). If allowed by the security policy (step 109), a search for other UEFI drivers available to the system such as unauthorized or unsigned drivers loaded from disk or another location or that are otherwise available to the computing system will be conducted (for example a search to find a previously downloaded driver as opposed to a driver that was resident in the flash store of the expansion card when shipped) (step 110). As previously noted, signed but unauthorized UEFI drivers may be treated as unsigned drivers by the security policy. If an allowable UEFI driver is found (step 111), the expansion card is approved for use and the driver is executed (step 106).

If an authorized UEFI driver is not found (step 111), and/or is not allowed (step 109), the security policy may be consulted to determine whether legacy Option ROMs are allowed to be utilized on the computing device (step 113). It will be appreciated that the security policy can also be consulted at other times and in a different sequence without departing from the scope of the present invention. If a legacy Option ROM is allowed to be utilized by the security policy (step 113), and a legacy Option ROM driver is located (step 115), the expansion card is approved for use and the driver is executed (step 106). The execution of such a legacy option ROM will degrade somewhat the security of the system but may be allowed by the security policy as a trade-off to provide flexibility in the continued operation of the computer. The decision to run the legacy Option ROM is made based upon the card type and policy selections in force for the computing platform. In the event a decision is made to execute the legacy Option ROM driver, a software flag may be set to indicate to the booting operating system that the platform is operating in a degraded security state. The Operating system may take various actions depending upon its policies for this type of event.

If a legacy Option ROM driver is not located by the firmware code (step 115), or the legacy Option ROM driver is not allowed (step 113), the expansion card is not approved for use and the driver is not initialized during the boot sequence (step 116). It should be appreciated that the card may still be used later after the OS is booted provided the OS driver is able to initialize the card. Notwithstanding the above exemplary processing sequence, it should be noted that the system security database in a UEFI-compatible device also includes an untrusted signer list (also known as the "forbidden signer list"). If a driver is discovered to be signed by a signer on this list, the driver is not executed.

It should be appreciated that the embodiments of the present invention are not limited to the examination of expansion cards plugged into an expansion slot as described above. The embodiments of the present invention also protect against other attack vectors from unauthorized parties that do not originate with an expansion card. For example, a computing system may be examined for other devices requiring an Option ROM driver in addition to expansion cards as a computer system may have many devices already built into the motherboard that require an Option ROM for initialization. The UEFI BIOS can be built with those Option ROMs already in place in the flash memory part co-residing with the UEFI BIOS. Those Options ROMs may also be subject to the Secure Option ROM policy even though they were included with the original production of the computer system. To prevent these included Option ROMs from being updated and replaced by a rogue virus Option ROM, the embodiments of the present invention may verify all Option ROMS available to the system on every system boot.

Figure 2:
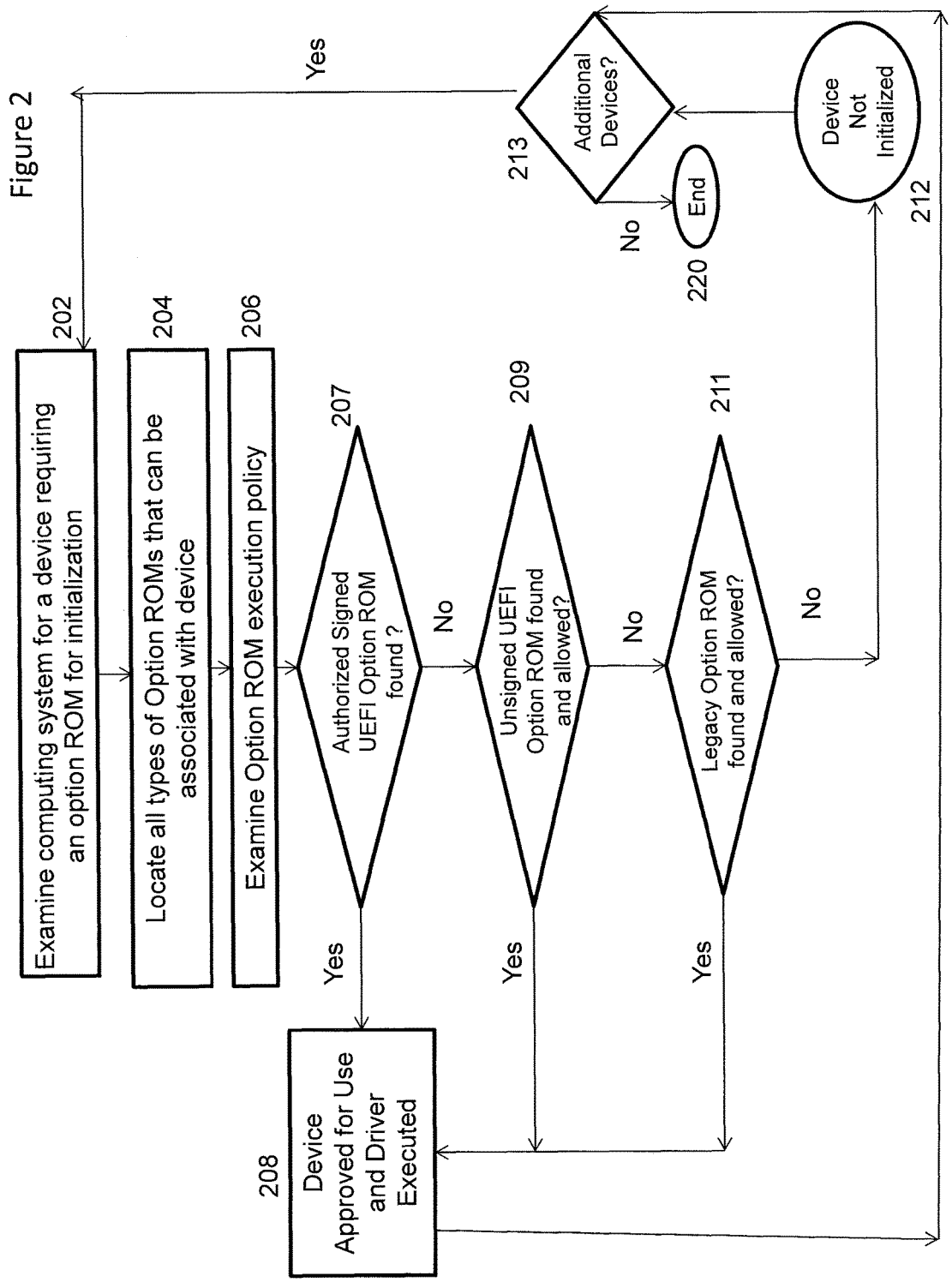
FIG. 2 depicts an exemplary sequence of steps to verify drivers associated with devices requiring an Option ROM driver for initialization.

FIG. 2 depicts an exemplary sequence of steps followed by an embodiment of the present invention to verify drivers associated with devices requiring an Option ROM for initialization. The sequence begins with the provision of power to a computing device and the detection of a device requiring an Option ROM for initialization during the boot sequence (step 202). A programmatic search is then conducted to locate all types of Option ROMs that can be associated with the device (step 204). For example, Option ROMs can be included with a PCI device on an expansion card, or included in the UEFI Firmware image itself, placed in memory (RAM) in compliance with the UEFI Firmware specification, or located in other areas. Regardless of location, the Firmware of the present invention detects the Option ROM. Following the locating of all of the types of available Option ROMS (step 204), the Option ROM execution policy for the computing device is examined (step 206). If an authorized signed UEFI Option ROM is found during the search (step 207), the device is approved for use and the driver executed (step 208). If not, if an unsigned (or unauthorized) UEFI Option ROM is found during the search and allowed by the policy (step 209), the device is approved for use and the driver executed (step 208). If not, if a legacy UEFI Option ROM is found during the search and allowed by the policy (step 211), the device is approved for use and the driver executed (step 208). Otherwise, the device is not initialized (step 212). It should be appreciated that the device may still be used later after the OS is booted provided the OS driver is able to initialize the device. If additional devices exist that have not been processed (step 213), after either the decision to not initialize a previous device (step 212) or the allowance of use for a previous device (step 208), the process iterates until no more devices remain to be processed at which time the sequence ends (step 220). As previously described above, notwithstanding the above description of exemplary processing, if a driver is discovered that is signed by a signer on the "forbidden signer" list, the driver is not executed.

Figure 3B:
Figure 3B:

FIGS. 3A-3H depict an exemplary setup user interface 300 provided by an embodiment of the present invention that enables an IT administrator or other authorized individual to set up or view a security policy controlling the execution of Option ROM drivers on a UEFI-compliant computing device. The setup user interface may list all Option ROMs detected in the computing platform/device for each detected expansion card. For example, as depicted in FIG. 3A, the user interface may list the expansion cards detected (as shown in the displayed PCI device column 302), the manufacturer of the card (as shown in the displayed PCI vendor column 304) and the Option ROM type information columns 306. For example, the Option ROM type information may note for each card whether the associated driver is a signed UEFI driver, an unsigned UEFI driver or a legacy Option ROM driver. Thus in the listing in FIG. 3A, the system has both UEFI and legacy Option ROM drivers for the Widget and AFAF expansion cards. For the NIC expansion card, the system has detected only a legacy Option ROM driver. Likewise for the 19AA expansion card, the system has detected only a UEFI Option ROM driver.

In one embodiment, depicted in FIG. 3B, a padlock symbol 310 or other indicator may be displayed next to a UEFI label in the Option ROM type information so as to indicate that the Option ROM driver associated with the expansion card is signed and meets UEFI 2.3 (or other version) security requirements.

As depicted in FIG. 3C, the setup user interface may allow an IT administrator to select which Option ROMs are allowed to be used in the computing system. For example, in one embodiment, the selection may be made by placing a check 312 in a box next to the Option ROM type to indicate an approved Option ROM driver. Alternatively, the absence of a check may be interpreted as disallowing use of the accompanying driver. Thus in FIG. 3C, the IT administrator has chosen to allow execution of only signed UEFI drivers. The setup user interface thus provides the IT administrator or other authorized user great control over what if any security trade-off is made when executing Option ROM drivers.

Alternatively, as depicted in FIG. 3D, the IT administrator may make a selection allowing the use of a less secure legacy Option ROM 314 or unsigned or unauthorized UEFI Option ROM 316. The selection of a legacy Option ROM 314 allows backwards compatibility of the system at the price of a less secure execution environment. Likewise the allowance of execution by an unsigned or unauthorized UEFI Option ROM 316 also increases performance flexibility at a cost of varying from the goals of the UEFI specification.

The embodiments of the present invention may also allow an authorized individual to pre-set a security policy covering future discovered expansion cards. For example, as depicted in FIG. 3E, an IT administrator can enter information for a particular Option ROM 320 not yet discovered in the computing system. Thus in FIG. 3E an unsigned UEFI driver associated with expansion card [ABCD] 320 from vendor [1234] 322 will be allowed to execute. It will be appreciated that all cards for a particular vendor could also be authorized.

Similarly, instead of just setting a policy for a particular card or vendor as shown in FIG. 3E, the security policy may be set for all future discovered expansion cards. For example, as shown, in FIG. 3F, the IT administrator may use the setup user interface of the present invention to pre-set a policy for all undiscovered cards 324. In the displayed example the security policy only allows the use of signed UEFI drivers. The application of the policy set up in FIG. 3F may be seen in FIG. 3G. As shown in FIG. 3G, the setting of this policy (depicted in FIG. 3F) controls the discovery of later cards such as the two AMD® cards 326 and 328 listed in FIG. 3G. As a result of the earlier policy decision, only the signed UEFI driver 330 will be allowed to execute while the unsigned UEFI Option ROM driver 332 will be prevented from executing.

Although the user setting of the security policy has been described above, other embodiments of the present invention may prevent the user from configuring the security policy in part or in whole. For example, as depicted in FIG. 3H, security policy information controlling execution of Option ROMs for expansion/option cards may be displayed in the setup user interface but may be permanently set by Original Equipment Manufacturers (OEMs) and Original Design Manufacturers (ODMs) and therefore be unchangeable by a company IT administrator or other individuals. A graphical indicator such as a shaded box 340 or other indicator may inform the user of the user's inability to change the policy.

The embodiments of the present invention thus provide a great degree of control over the security policy implemented by the firmware on a computing device. An authorized company user may determine which Option ROMs are appropriate for the environment. Unauthorized Option ROMs may be quarantined to increase security. A full spectrum of control ranging from executing only authorized signed UEFI option ROMS (most secure) to legacy Option ROMs (least secure) is provided by the embodiments described herein thus allowing appropriate environment-specific choices to be made on a company-by-company or user-by-user basis. Further, as noted above, these choices may alternatively be hard-coded and unchangeable in the provided setup user interface. It should be appreciated that while the description of FIGS. 3A-3G above has focused on the display of information regarding Option ROM drivers associated with detected expansion cards, the information being displayed by the UI may instead relate to Option ROM drivers for other system devices detected by the firmware during the boot phase of the UEFI-compliant computing device that require an Option ROM driver for their initialization.

Figure 4:
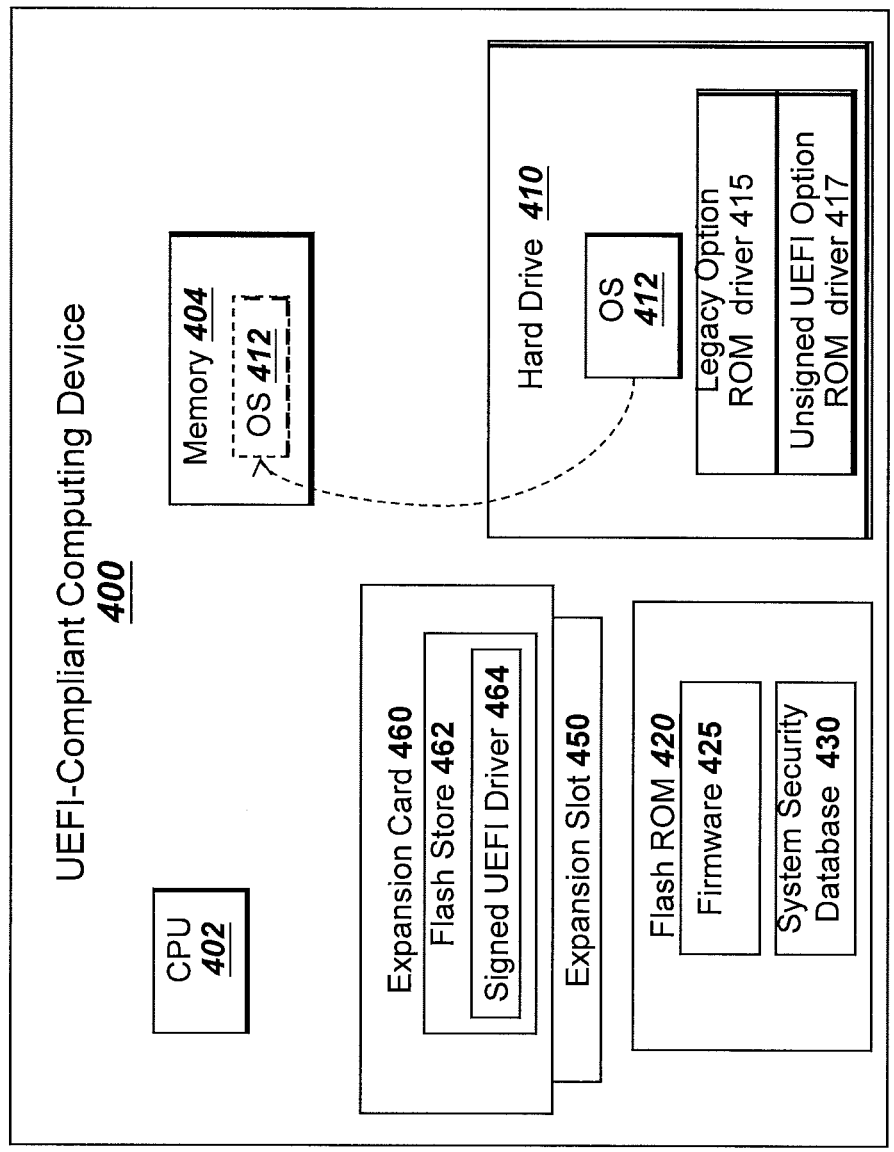
FIG. 4 depicts an exemplary environment suitable for practicing embodiments of the present invention.

FIG. 4 depicts an exemplary environment suitable for practicing embodiments of the present invention. A UEFI-compliant computing device 400 includes a CPU 402 used to process instructions. The computing device 400 may be a PC, laptop computer, tablet computing device, server, smartphone or some other type of computing device equipped with a processor and able to comply with the requirements of the UEFI specification. The computing device 400 may also include a memory 404 such as Random Access Memory (RAM). An operating system 412 that is stored on a hard drive 410 or other non-volatile storage that is in, or in a location in communication with, computing device 400 may be loaded into memory 404 as part of a boot process performed by the computing device.

The computing device 400 may also include flash ROM 420. In some cases the system design may incorporate multiple flash ROM devices. Flash ROM 420 may include firmware as described above that is operable at different points of the computing device's operation. For example, flash ROM 420 may include a firmware 425 responsible for setting and/or enforcing a security policy as set forth above. The flash ROM 420 may also hold a system security database 430 holding authorized keys used for signature checking as set forth in the UEFI specification.

Computing device 400 may also include an expansion slot 450 holding an expansion card 460. The expansion card 460 may include a flash store 462 holding at least one signed UEFI Option ROM driver 464. The driver signature may be checked using driver signature information contained in system security database 430 prior to authorizing execution of the signed UEFI Option ROM driver 464. In the event flash store 462 fails to hold an authorized signed UEFI driver, firmware 425 may examine other unsigned, unauthorized and/or legacy Option ROM drivers present or accessible to computing device 400 pursuant to the security policy as described above. For example, firmware 425 may cause the examination of unsigned UEFI Option ROM driver 415 or legacy Option ROM driver 417 depending upon the details of the security policy.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A firmware-implemented method for enforcing a security policy on a Unified Extensible Firmware Interface (UEFI)-compliant computing device, comprising:
   detecting a presence of an expansion card in an expansion card slot on the UEFI-compliant computing device, the detecting occurring during a boot phase before loading of an operating system for the computing device;
   identifying a type for each of one or more Option ROM drivers that are compatible with the expansion card and available for execution by the computing device;
   consulting a pre-configured security policy regarding Option ROM driver execution for the computing device, the pre-configured security policy referencing a plurality of different types of Option ROM drivers including one or more types of UEFI Option ROM drivers and a legacy Option ROM driver type and indicating allowance or disallowance of execution for each of the plurality of different types of Option ROM drivers based on the type of Option ROM driver, the pre-configured security policy allowing execution of at least one other type of Option ROM driver in addition to allowing execution of an authorized signed UEFI driver; and
   executing, based on the pre-configured security policy, at least one of the one or more available Option ROM drivers, wherein:
      when the identified type of one of the one or more available Option ROM drivers is an authorized signed UEFI driver, the authorized signed UEFI driver is executed, and
      when the identified type of none of the one or more available Option ROM drivers is an authorized signed UEFI driver, another identified type of Option ROM driver for one of the one or more available Option ROM drivers that is allowed by the security policy is executed.

2. The method of claim 1 wherein the another identified type of Option ROM driver is an unsigned UEFI Option ROM driver.

3. The method of claim 1 wherein the another identified type of Option ROM driver is legacy Option ROM driver.

4. The method of claim 1 further comprising: allowing, based on the security policy, an unsigned UEFI Option ROM driver to be executed on the UEFI-compliant computing device.

5. The method of claim 1 further comprising: allowing, based on the security policy, a legacy Option ROM driver to be executed on the UEFI-compliant computing device.

6. The method of claim 1 wherein the identified at least one Option ROM driver is located at a location other than a flash memory store on the expansion card.

7. A non-transitory medium holding computer-executable instructions for enforcing a security policy on a Unified Extensible Firmware Interface (UEFI)-compliant computing device, the instructions when executed causing a UEFI-compliant computing device to:
   detect a presence of an expansion card in an expansion card slot on the UEFI-compliant computing device, the detecting occurring during a boot phase before loading of an operating system for the computing device;
   identify a type for each of one or more Option ROM drivers that are compatible with the expansion card and available for execution by the computing device;

consult a pre-configured security policy regarding Option ROM driver execution for the computing device, the pre-configured security policy referencing a plurality of different types of Option ROM drivers including one or more types of UEFI Option ROM drivers and a legacy Option ROM driver type and indicating allowance or disallowance of execution for each of the plurality of different types of Option ROM drivers based on the type of Option ROM driver, the pre-configured security policy allowing execution of at least one other type of Option ROM driver in addition to allowing execution of an authorized signed UEFI driver; and execute, based on the pre-configured security policy, at least one of the one or more available Option ROM drivers, wherein:

when the identified type of one of the one or more available Option ROM drivers is an authorized signed UEFI driver, the authorized signed UEFI driver is executed, and when the identified type of none of the one or more available Option ROM drivers is an authorized signed UEFI driver, another identified type of Option ROM driver for one of the one or more available Option ROM drivers that is allowed by the security policy is executed.

8. The medium of claim 7 wherein the another identified type of Option ROM driver is an unsigned UEFI Option ROM driver.

9. The medium of claim 7 wherein another identified type of Option ROM driver is legacy Option ROM driver.

10. The medium of claim 7 wherein the instructions when executed further cause the UEFI-compliant computing device to: allow, based on the security policy, an unsigned UEFI Option ROM driver to be executed on the UEFI-compliant computing device.

11. The medium of claim 7 wherein the instructions when executed further cause the UEFI-compliant computing device to: allow, based on the security policy, a legacy Option ROM driver to be executed on the UEFI-compliant computing device.

12. The medium of claim 7 wherein the identified at least one Option ROM driver is located at a location other than a flash memory store on the expansion card.

13. A Unified Extensible Firmware Interface (UEFI)-compliant computing device, comprising:
a Read Only Memory (ROM) holding firmware;
at least one expansion card slot holding an expansion card;
one or more Option ROM drivers that are compatible with the expansion card and accessible by the firmware, and
a processor configured to execute the firmware during a boot sequence following an identification of the expansion card and before operating system loading, the execution of the firmware:
identifying a type for each of the one or more Option ROM drivers that are compatible with the expansion card and available for execution by the computing device,
consulting a pre-configured security policy regarding Option ROM driver execution for the computing device, the pre-configured security policy referencing a plurality of different types of Option ROM drivers including one or more types of UEFI Option ROM drivers and a legacy Option ROM driver type and indicating allowance or disallowance of execution for each of the plurality of different types of Option ROM drivers based on the type of Option ROM driver, the pre-configured security policy allowing execution of at least one other type of Option ROM driver in addition to allowing execution of an authorized signed UEFI driver, and executing, based on the pre-configured security policy, at least one of the one or more available Option ROM drivers, wherein:

when the identified type of one of the one or more available Option ROM drivers is an authorized signed UEFI driver, the authorized signed UEFI driver is executed, and when the identified type of none of the one or more available Option ROM drivers is an authorized signed UEFI driver, another identified type of Option ROM driver for one of the one or more available Option ROM drivers that is allowed by the security policy is executed.

14. The UEFI-compliant device of claim 13, further comprising:
a display surface in communication with the UEFI-compliant computing device, the display surface displaying a setup user interface (UI), the setup user interface displaying information regarding the pre-configured security policy.

15. The UEFI-compliant computing device of claim 14 wherein the setup UI provides a graphical indicator related to a security characteristic of the at least one Option ROM driver.

16. The UEFI-compliant computing device of claim 14 wherein the setup UI enables a user to designate a listed Option ROM for execution.

17. The UEFI-compliant computing device of claim 14 wherein the setup UI provides a graphical indicator regarding at least one Option ROM driver that is authorized to execute on the UEFI-compliant computing device.

18. The UEFI-compliant computing device of claim 14 wherein the setup UI enables a user to change the security policy regarding Option ROM driver execution.

19. The UEFI-compliant computing device of claim 18 wherein the characteristics of the displayed security policy regarding Option ROM driver execution are not changeable by a user.

20. The UEFI-compliant computing device of claim 14 wherein the setup UI enables a user to add to the pre-configured security policy to control the execution of future discovered Option ROM drivers.

21. A firmware-implemented method for enforcing a security policy on a Unified Extensible Firmware Interface (UEFI)-compliant computing device, comprising:
detecting a device on a UEFI-compliant computing device that requires an Option ROM driver for initialization, the detecting occurring during a boot phase before loading of an operating system for the computing device;
identifying a type for each of one or more Option ROM drivers that are compatible with the detected device and available for execution by the computing device;
consulting a pre-configured security policy regarding Option ROM driver execution for the computing device, the pre-configured security policy referencing a plurality of different types of Option ROM drivers including one or more types of UEFI Option ROM drivers and a legacy Option ROM driver type and indicating allowance or disallowance of execution for each of the plurality of different types of Option ROM drivers based on the type of Option ROM driver, the pre-configured security policy allowing execution of at least one other type of Option ROM driver in addition to allowing execution of an authorized signed UEFI drivers; and executing, based on the pre-configured security policy, at least one of the one or more Option ROM drivers, wherein:

when the identified type of one of the one or more available Option ROM drivers is an authorized signed UEFI driver, the authorized signed UEFI driver is executed, and when the identified type of none of the one or more available Option ROM drivers is an authorized signed UEFI driver, another identified type of Option ROM driver for one of the one or more available Option ROM drivers that is allowed by the security policy is executed.

22. A non-transitory medium holding computer-executable instructions for enforcing a security policy on a Unified Extensible Firmware Interface (UEFI)-compliant computing device, the instructions when executed causing a UEFI-compliant computing device to:

detect a device on the UEFI-compliant computing device that requires an Option ROM driver for initialization, the detecting occurring during a boot phase before loading of an operating system for the UEFI-compliant computing device;

identify a type for each of one or more Option ROM drivers that are compatible with the detected device and available for execution by the computing device;

consult a pre-configured security policy regarding Option ROM driver execution for the computing device, the pre-configured security policy referencing a plurality of different types of Option ROM drivers including one or more types of UEFI Option ROM drivers and a legacy Option ROM driver type and indicating allowance or disallowance of execution for each of the plurality of different types of Option ROM drivers based on the type of Option ROM driver, the pre-configured security policy allowing execution of at least one other type of Option ROM driver in addition to allowing execution of authorized signed UEFI drivers; and execute, based on the pre-configured security policy, at least one of the one or more Option ROM drivers, wherein:

when the identified type of one of the one or more available Option ROM drivers is an authorized signed UEFI driver, the authorized signed UEFI driver is executed, and when the identified type of none of the one or more available Option ROM drivers is an authorized signed UEFI driver, another identified type of Option ROM driver for one of the one or more available Option ROM drivers that is allowed by the security policy is executed.

* * * * *